United States Patent [19]
Wolfe et al.

[11] Patent Number: 5,914,144
[45] Date of Patent: *Jun. 22, 1999

[54] METHOD FOR PACKAGING AND STORING FRUITS AND VEGETABLES

[76] Inventors: Steven K. Wolfe, 13642 Pathway Ave., Truckee, Calif. 96162; Michael Y. Tani, 2225 Skyway Dr., Santa Maria, Calif. 93455

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,633

[22] Filed: Sep. 17, 1996

[51] Int. Cl.$^6$ .......................... A23L 3/3409; A23B 7/144; B65B 11/00; B65B 25/04

[52] U.S. Cl. .......................... 426/412; 426/415; 426/419; 426/316

[58] Field of Search .................... 426/415, 316, 426/419, 412, 413, 318, 319

[56] References Cited

U.S. PATENT DOCUMENTS

| | | | |
|---|---|---|---|
| 2,452,174 | 10/1948 | Arnold | 426/415 |
| 3,134,679 | 5/1964 | Dreyfus | 426/412 |
| 3,682,028 | 8/1972 | Clayton et al. | 426/415 |
| 4,515,266 | 5/1985 | Myers | 426/419 |
| 4,873,814 | 10/1989 | Harris | 426/412 |
| 4,886,372 | 12/1989 | Greengrass et al. | 426/415 |
| 5,171,593 | 12/1992 | Doyle | 426/415 |
| 5,226,735 | 7/1993 | Beliveau | 426/415 |
| 5,318,789 | 6/1994 | Nakagawa et al. | 426/316 |
| 5,492,705 | 2/1996 | Porchia et al. | 426/415 |
| 5,565,230 | 10/1996 | Bailey | 426/316 |
| 5,698,249 | 12/1997 | Hayashi et al. | 426/415 |

FOREIGN PATENT DOCUMENTS

| | | | |
|---|---|---|---|
| 6-125698 | 5/1994 | Japan | 426/415 |
| 7015228 | 4/1971 | Netherlands | 426/415 |
| 2179025 | 2/1987 | United Kingdom | 426/419 |

OTHER PUBLICATIONS

Modern Packaging Jun. 1948 pp. 163–165.
Dep. Food Sci. Tech., Univ. Georgia, Floros et al Extending the Shelf Life of Tomatoes by Individual Seal Packaging, 1987.
Harvest & Postharvest Technologies for Fresh Fruits & Vegetables American Soc. of Agricultural Engineers pp. 339–346 (Dialog Abstract), 1995.
Food Manufacture Intil 10(2) May 1993 p. 9 (Dialog Abstract).
The Effect of MDD. ATM. & Temp. on Cauliflower Quality During Storage, pp. 27–37, Napitupulu et al (Dialog Abstract), 1992.
Food Ind. News Oct. 1992, p. 22 (Dialog Abstract).
Mater. Handl. News No. 415 Jul. 1992 p. 12 (Dialog Abstract).
Voedingsmiddelentechnologie vol. 17 No. 9, pp. 64–67 (Dialog Abstract), Apr. 26, 1984.
New Scientists Aug. 14, 1986, p. 35 Plus 426/419.
J. of Food Protection vol. 41, No. 5 pp. 348–350 May 1978 426/419.

*Primary Examiner*—Steven Weinstein
*Attorney, Agent, or Firm*—Jeffrey A. Hall

[57] ABSTRACT

A method for packaging fruits and vegetables, where a fruit or portion of a fruit, or a vegetable or a portion of a vegetable are packaged forming a wrapped product for transport or storage, the wrapped product having an open surface area of at least two-percent. The method comprises perforating a shrinkable film having a pre-shrunk size and a shrunken size with a plurality of apertures so that the apertures are spaced at selected positions on the pre-shrunk size of shrinkable film. The fruit or the vegetable is then enclosed in the pre-shrunk size of the shrinkable film so that when the pre-shrunk size is converted to the shrunken size, the shrunken size film forms a tight enclosure around a portion of the fruit or vegetable, such as a crown portion, and has a girdle of apertures around an open area of the fruit or vegetable, such as a stem area.

6 Claims, 2 Drawing Sheets

A MATERIAL FOR PACKAGING FRUIT OR VEGETABLE

1 — PERFORATING A SHRINKABLE FILM (12), HAVING A PRE-SHRUNK SIZE (14) AND A SHRUNKEN SIZE (16), WITH A PLURALITY OF APERTURES (18) SO THAT THE APERTURES ARE SPACED AT SELECTED POSITIONS ON THE PRE-SHRUNK SIZE (14) OF THE SHRINKABLE FILM (12)

2 — ENCLOSING THE FRUIT OR VEGETABLE IN THE PRE-SHRUNK (14) SIZE OF THE SHRINKABLE FILM (12) SO THAT WHEN THE PRE-SHRUNK SIZE (14) IS CONVERTED TO THE SHRUNKEN SIZE (16), THE SHRUNKEN SIZE FILM FORMS A TIGHT ENCLOSURE AROUND A CROWN PORTION OF THE FRUIT OF VEGETABLE AND HAS A GIRDLE OF APERTURES (22) AROUND A STEM PORTION OF THE FRUIT OR VEGETABLE

*Fig. 1*

METHOD FOR PACKAGING AND STORING FRUITS AND VEGETABLES

BACKGROUND OF THE INVENTION

1. Field of Invention

This invention relates to methods for packing, storing, and transporting fresh and processed fruits and vegetables, and particularly to methods for packing, storing, preserving, and transporting vegetables such as broccoli for international shipments and enabling achievement of foreign and domestic quarantine requirements.

2. Description of the Related Art

Various methods and apparatuses have been proposed and implemented to effect the packing, storing, and transport of fresh and processed fruits and vegetables. The exportation of fruits and vegetables from the United States has increased dramatically in recent years. One area of rapid increase is the exportation of broccoli to Japan, recently achieving a volume of over 200 42-foot refrigerated sea containers in one week. Each sea container typically contains from 912 to 960 cartons of broccoli. The broccoli carton is additionally completely filled with ice and this included weight limits the amount of broccoli that can be delivered in the sea container to the port, or other domestic destination, because of United States Department of Transportation safety standards with regard to maximum transportable weight.

Exporters of broccoli and other fruits and vegetables have been actively seeking other methods of delivering a greater number of vegetables in each container in order to reduce unit freight costs. One such approach uses controlled and modified atmosphere systems. The use of these controlled-gas systems retards the spoilage rate, or senescent decay of the vegetable, thus reducing the requirement for ice and the concomitant weight problems. However, such methods are limited by problems such as humidity control in transit, cost and technical requirements.

In the United States, over-wrap and shrink-wrap packaging films have long been used by shippers and retailers to maintain cleanliness and reduce moisture loss in the packaging, shipping and transport of fruits and vegetables. The use of shrink-wrap film has begun to increase dramatically as a method to increase domestic freight efficiencies and also to provide a more attractive and longer lasting product.

Both in the United States and Japan, retailers frequently over-wrap fruits and vegetables, and particularly broccoli, both domestic and imported, with plastic films to prevent handling abuse and to allow for placement of scanner tags or labels. Since labor cost are in general very high in Japan, there is great interest in receiving the product in that country in a wrapped state. Heretofore, however, this has not been possible because of the Japanese Plant Quarantine regulations.

The Plant Quarantine Department in Japan is charged with protecting their island country from pests or diseases common to agricultural crops in other parts of the world. Their zeal and conscientiousness in carrying out this mandate is high. One requirement germane to the present methodology is a requirement with regard to the ability of a packaged vegetable or fruit to undergo fumigation, where that may be required as a result of inspection. That is, any packaged fresh fruit or vegetable must have minimum of 2% open area on its container. This includes cartons, bags, over-wraps, etc. In the case of shrink-wrap protected products, this standard also applies.

Accordingly, there are broadly five difficulties which need to be resolved in formulating a method to satisfy the Japanese Quarantine requirements, which because or their rigorous nature, also will satisfactorily meet essentially all other quarantine and inspection requirements throughout the world:

i) hole size ii) change in shape and dimension iii) hole making iv) product damage v) hole blockage With regard to (i) hole size; it must be adequate to consistently provide for open space in excess of 2%. If this is not satisfactory, and fumigation is called for, each wrap must be removed by hand salvage the product. Typically, the number of pieces may exceed 50,000 in a single container with prohibitive costs and product damage.

Regarding (ii) change in shape; shrinking of the film changes the shape of the hole or holes, resulting in enlargement of the hole where tension is developed, and shrinkage where tension is lacking. This presents a risk with regard to minimum open space and also to the Japanese Plant Quarantine inspection interpretation of net hole size.

As to (iii) hole making; the simple multiplication of pinholes is not a satisfactory method. The number of holes required may result in a web of film which is mechanically difficult to handle. In order to obtain the 2% coverage required in Japan, for example, there must be a pattern of holes such that their total open area relative to the final area of the shrunken film is at least 2%. For example, for a finished area of 600 square centimeters, a minimum of 12 square centimeters of open area is needed. For pinholes or punctures that are effectively 0.2 millimeters in diameter, approximately 400 holes are required. To account for changes in shape and product blockage of holes, a 10-fold multiple may be needed. Also, the use of these small holes is not productive since Japanese Plant Quarantine officials require a method that is straightforward and routine for examination of compliance.

With regard to (iv) product damage and (v) hole blockage; if numerous holes are placed throughout the film widespread and spotty decay of the open space areas of the fruit or vegetable may result, and lead to a net open area of the film being deemed insufficient by inspectors.

According, it would be highly desirable to have a method for eliminating the above described problems in the packaging, shipping and transport of fruits and vegetables. The present invention provides a simple but unique method to eliminate the above described problems and describes in particular, the placement of holes to take advantage of the morphological characteristics of broccoli and related vegetables so as to ensure that tension developed during shrinking of the film results in hole enlargement, and that the holes are spaced and positioned so as to prevent blockage by the product.

It is a further object of the invention to provide a method for packing, and transporting fruits and vegetables which allows such fruits and vegetables to be packaged and shipped over extended distances involving significant time periods while preserving all of the critical and important characteristics of such fruits and vegetables while guaranteeing a commercially attractive product, and which is inexpensive to apply and highly efficient in results.

Additional objects and advantages of the invention will be set forth in the description which follows, and in part will be obvious from the description, or may be learned by practice of the invention. The objects and advantages of the invention may be realized and obtained by means of the methods and combinations particularly pointed out in the appended claims.

SUMMARY OF THE INVENTION

The present invention provides a method for packaging fruits and vegetables allowing for domestic and international shipping of such produce while preserving all of the critical and desired characteristics of the produce. It is the principal purpose of the present invention to provide a method and means for applying such method so that fresh and processed fruits and vegetables may be conveniently yet efficiently packed in a manner so as to meet both domestic and international inspection and quarantine regulations while providing a high quality and long lasting product for consumer purchase.

To achieve the foregoing objects, and in accordance with the purpose of the invention as embodied and broadly described herein, a method is provided for packaging fruits and vegetables, where a vegetable or portion of a vegetable, or fruit or portion of a fruit are packaged for transport or storage, comprising perforating a shrinkable film having a pre-shrunk size and a shrunken size with a plurality of apertures so that the apertures are spaced at selected positions on the pre-shrunk size of shrinkable film. Then the fruit or vegetable is enclosed in the pre-shrunk size of the shrinkable film so that when the pre-shrunk size is converted to the shrunken size, the shrunken size film forms a tight enclosure around a portion of the fruit or vegetable, such as the crown, and has a girdle of apertures around an open area, such as the stem portion, defined by the morphology of the fruit or of the vegetable.

The method of the present invention is preferably used with vegetables such as broccoli. However, in alternative applications the method of the present invention may be applied for use with other vegetables and fruits. In fact, the particular application is dependent only upon the requirements of the user as a wide range of fruits and vegetables could be packaged, stored and transported using the methodology described herein.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a flow chart of the method for packing fresh and processed fruits and vegetables, according to the invention.

DESCRIPTION OF THE PREFERRED EMBODIMENTS

Figure 2:
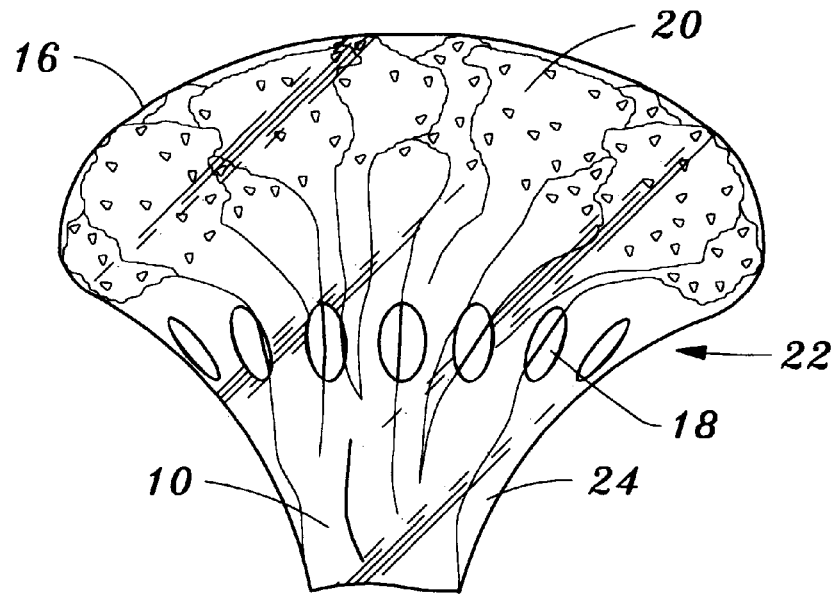
FIG. 2 shows a packaged broccoli product, according to the invention.

Reference will now be made in detail to the present preferred embodiments of the invention as illustrated in the accompanying drawings.

Accordingly, a method is provided for packaging fresh and processed fruits and vegetables, where a vegetable or portion of a vegetable, or fruit or portion of a fruit are packaged for transport or storage, comprising, perforating a shrinkable film having a pre-shrunk size and a shrunken size with a plurality of apertures so that the apertures are spaced at selected positions on the pre-shrunk size of shrinkable film. Then the fruit or vegetable is enclosed in the pre-shrunk size of the shrinkable film so that when the pre-shrunk size is converted to the shrunken size, the shrunken size film forms a tight enclosure around a crown portion of the vegetable and has a girdle of apertures around a stem portion of the vegetable.

There is also provided, in accordance with the invention a method of packaging broccoli, or *Brassica oleracea botrytis*, other members of the mustard family such as cauliflower, and other fruits and vegetables, where the fruit or vegetable is packaged for transport forming a wrapped product, the wrapped product having an open surface area of at least two-percent, comprising: perforating a shrinkable film having a pre-shrunk size and a shrunken size with a plurality of apertures so that the apertures are spaced at selected positions on the pre-shrunk size of shrinkable film. The broccoli, or other fruit or vegetable, is then enclosed in the pre-shrunk size of the shrinkable film so that when the pre-shrunk size is converted to the shrunken size, the shrunken size film forms a tight enclosure around a crown portion of broccoli, and has a girdle of apertures around a stem portion of the broccoli.

In FIG. 1, a flow diagram is shown outlining the preferred steps of the method of the present invention. In step 1, a shrinkable film 12, having a pre-shrunk size 14 and a shrunken size 16, is perforated with apertures 18 when in pre-shrunk size 14. The apertures are preferable sphericaly shaped, however, other geometric shapes may be used, such as oval, rectangular, triangular, and the like, in alternative embodiments.

Apertures 18 may be placed in shrinkable film 12 in a wide variety of ways such as using a pinwheel device attached to a conventional packaging machine, using any stamping or boring device capable of making apertures in a controlled manner in film or plastics such as electrically powered devices, or by manual cutting or stamping of the apertures in the film. It will be apparent that the positioning of apertures 18 may be varied depending upon the packaging machinery chosen both in terms of size and positioning. It is also apparent that depending upon the size and shape of the fruit or vegetable, or portion thereof to be packaged, the size of apertures 18 will vary. Preferably apertures 18 are of uniform size which is generally more practical in application, however, this need not be the case. The precise number of apertures 18 may vary and within the methodology herein disclosed may be modified and related to the type of shrinkable film used, it thickness, the heat used to shrink the shrinkable film, the time of film exposure to a given amount of heat, the overall envelope of film needed to bag the product, and the desired relative final open space represented by the apertures in the film.

The shrinkable film 12 may be high density, mid-density, or low density breathable polyethylene for example, or other non-surface adhering thermoplastics may be utilized such as linear low density polyethylene, polypropylene, polystyrene, biaxially oriented polypropylene, vinyl acetate copolymers, polyvinyl chloride, mixtures or the foregoing, multilayer films of the foregoing, and other polymers and copolymers. A critical characteristic of any film or membrane used is that it is capable of undergoing shrinking, that is, being converted from the pre-shrunk size 14 to a shrunken size 16 in response to heat or other selectively applied force.

In step 2 of the flow chart shown in FIG. 1, the fruit or vegetable, or cut portion thereof, is then enclosed in the pre-shrunk size 14 of the shrinkable film 12. Then the pre-shrunk size 14 is converted to the shrunken size 16, for example, by passing it through a heat tunnel or other heat controlled environment. In practice, it is preferable to effect shrinkage of shrinkable film 12 by a quick passage through a heat tunnel so as to preclude heat build up in the packaged produce. The shrunken size film 16 forms a tight enclosure around a crown portion 20 of the fruit or vegetable 10. Apertures 18 are preferably positioned so that a girdle of apertures 22 is formed which encircle the stem portion of the fruit or vegetable, or open environment 24, as seen in FIG. 2.

Figure 3:
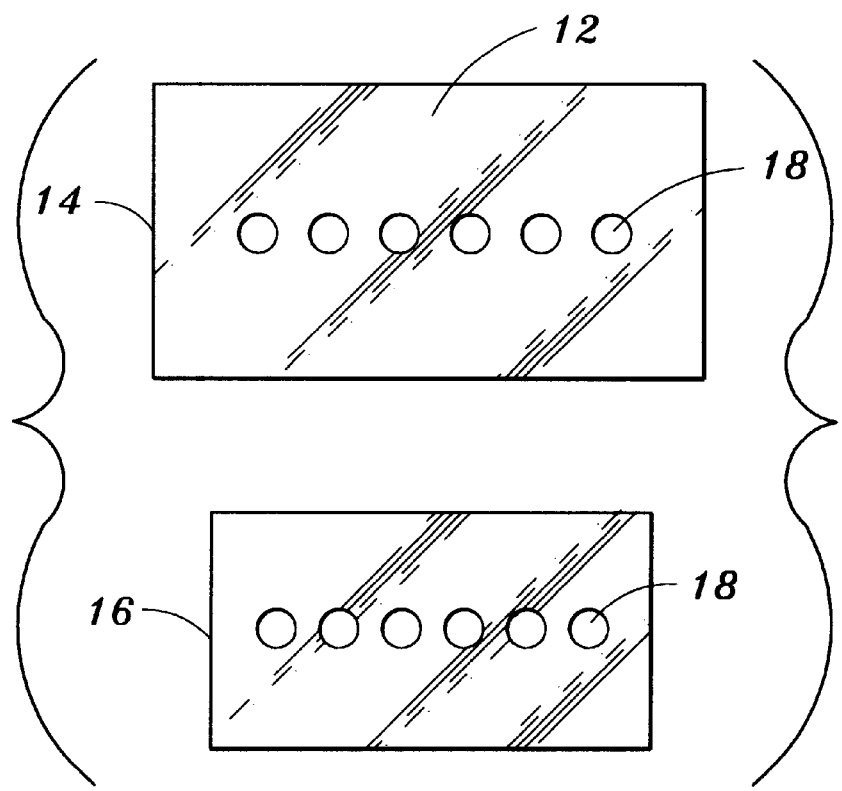
FIG. 3. shows a pre-shrunk size film with apertures and a shrunken size film with apertures following heat treatment, according to the invention.

With reference to FIG. 3, it is seen that apertures 18 placed in shrinkable film 12 when in the pre-shrunk size 14 comprise in excess of 1% of the surface area of the pre-shrunk size 14. Following heat treatment or other shrinking or stretching of film 12, preferably when the film is enclosing the fruit or vegetable, aperture 18 preferably constitute 2% to 3% of the surface area of shrunken size 16 of shrinkable film 12. It will be apparent, that for films with varying shrink and stretch characteristics, that varying amounts of aperture or open hole space may need to be provided to achieve the desired results.

An example of the preferred methodology of the present invention was the preparation of broccoli harvested for export to Japan. The broccoli was harvested in single stalks with uniform crown diameter of about 115 mm to 140 mm, preferably 120 mm to 135 mm with an overall length of 125 mm to 135 mm and placed in plastic totes. The broccoli was brought to a central processing site for cooling and packaging, which may be in either order. The broccoli was then packaged using the method of the present invention. There are several packaging machines available to effect the packaging of produce. In the present case, a Rennco Model 101 was used. However, other machines such as those known in the trade as L-bar scalers may also be used. A shrinkable film is then selected, in this case a standard 60 gauge (0.060 inch) thickness of a circular configuration making up about 1.2% of the surface area of the pre-shrunk size of the shrinkable film. The film was guided through the machine in a folded, bi-layer form, then the fold was opened either mechanically, or by hand for insertion of the broccoli, and then the film enclosed around the broccoli to fom a bag. The film was then passed through a heat tunnel to effect film shrinking. When shrunk the apertures constituted between 2–3% of the surface area of the film forming a girdle around the open section of the broccoli while fitting tightly around the crown and bud portion. Test shipments of the packaged broccoli was shipped to Japan by sea container with a transit time of 12 days under standard refrigerated conditions and controlled atmosphere in a refrigerated sea container. Subsequent storage was extended for over four weeks with excellent quality retention.

As seen in FIG. 2, by providing apertures 18 such that their relationships to the shrunken size 16 of shrinkable film 12, the packaging, and the harvested produce, such as broccoli, provide a row or girdle of apertures so that after the broccoli is enclosed in the film in an oriented position, the shrunken size film 16 forms a tight enclosure around the crown 20, leaving a girdle or row of apertures around the open environment 24 around the vegetable. Of course, the present method may be used with a wide variety of fruits and vegetables, such as cauliflower, carrots, grapes, and the like.

In operation and use the method of the present invention is highly efficient, cost effective, and easy to implement. The method of the present invention may be implemented in a produce room, packing house, in the field, or any other suitable building or location. The shrinking of the film achieves the desired effect, where the apertures are enlarged to remain in excess of, for example, Japanese Plant Quarantine requirements. The present method provides a plurality of apertures which are not blocked and are strategically positioned. The tight enclosure around the crown of the vegetable or fruit by the film allows for improved moisture retention and minimal oxidation, and if a fumigant is required, it may move freely in through the apertures, in accordance with the Japanese Plant Quarantine requirements, for example.

The method of the present invention as herein described in detail may be used with either fruits or vegetables, however, it is most conveniently used with vegetables such as broccoli, thereby allowing for the year-round supply of fresh supply of produce to both domestic and international consumers with all of the key and critical characteristics preserved. By providing an economical and efficient means to achieve accordance with international and domestic regulation and quarantine requirements, the present invention vastly increases the potential market size for such produce, while reducing product spoilage and loss, and minimizing confiscation and entrance denial by regulatory authorities.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A method for packaging either a vegetable or a portion of a vegetable, both having a non-uniform shape wherein said vegetable or said portion of vegetable is packaged for transport, storage and fumigation, and wherein said vegetable or said portion of vegetable comprises a crown portion and a stem, said method comprising:

perforating a shrinkable film to form a plurality of apertures in the film before the film is shrunk, enclosing said vegetable or said portion of a vegetable in said perforated shrinkable film, and shrinking said perforated shrinkable film such that the shrunken film forms a tight enclosure around said crown portion of said vegetable or said portion of vegetable and such that said shrunken film is spaced from said vegetable or said portion of a vegetable around a portion of said stem to form a space between the shrunken film and the stem, said plurality of apertures being sized such that said plurality of apertures comprise at least one percent of the surface area of said shrinkable film before shrinking and at least two percent of the surface area of said shrinkable film after said shrinkable film has been shrunk around said vegetable or said portion of vegetable, said plurality of apertures being positioned in said shrinkable film such that after said shrinkable film is shrunk around said vegetable or said portion of vegetable, said apertures form a girdle of apertures around the stem of said vegetable or said portion of vegetable in the portion of the shrunken film that is spaced from said stem and wherein the portion of the shrunken film that forms a tight enclosure around said crown portion is not perforated.

2. The method of claim 1, wherein said plurality of apertures are positioned in a linear relationship to one another.

3. The method of claim 1, wherein said plurality of apertures are positioned in a non-linear relationship to one another.

4. The method of claim 1, wherein each of said plurality of apertures is circularly configured.

5. The method of claim 1, wherein said pre-shrunk film size of said shrinkable film is converted to said shrunk film size of said shrinkable film by heat.

6. The method of claim 1, wherein said vegetable is broccoli.

* * * * *